Jan. 20, 1953   E. LEVY, JR   2,626,378
MEANS FOR MORE EASY STARTING OF INVERTERS AT LIGHT LOADS
Filed March 27, 1951
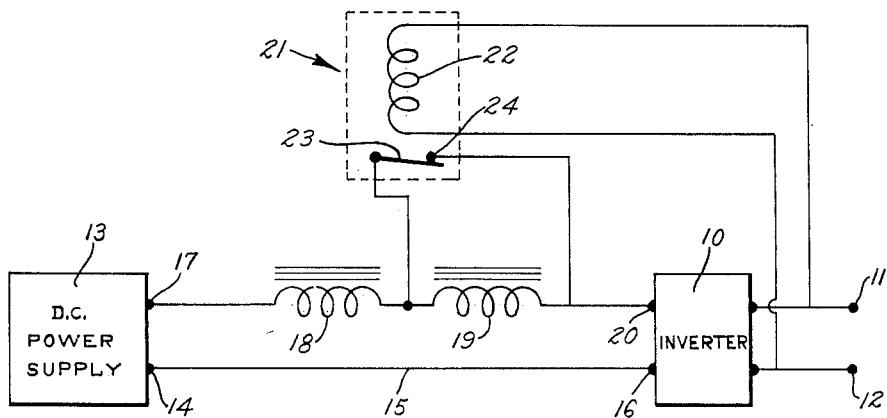
INVENTOR.
ERNEST LEVY, JR.
BY
ATTORNEY Patented Jan. 20, 1953

2,626,378

UNITED STATES PATENT OFFICE 2,626,378

MEANS FOR MORE EASY STARTING OF INVERTERS AT LIGHT LOADS

Ernest Levy, Jr., Bronx, N. Y., assignor to Sorensen & Company, Inc., Stamford, Conn., a corporation of Connecticut Application March 27, 1951, Serial No. 217,848

3 Claims. (Cl. 321—11)

This invention relates to electronic inverters and it relates more particularly to a circuit which enables an inverter to start easily at light loads.

The changing of direct current into alternating current is known as inversion and the electronic tube and its related circuit elements used for this purpose are known as inverters. For high current and dependable and highly efficient conversion, gas filled tubes having characteristically low impedance are used. Such circuits are well known in the art and are fully described in almost any electronics text.

In its simplest form, an inverter comprises two gas filled tubes which are rendered alternately conducting and non-conducting at a frequency governed by the frequency of an alternating synchronizing voltage applied to the grids. The action is then like two switches (i. e., the gas filled tubes) alternately connecting the ends of a center-tapped transformer to the negative end of a direct current voltage. The center tap is connected through a coil known as a commutating choke to the positive terminal of the direct current source. It is then evident that an alternating current will be developed across the secondary of the center-tapped transformer.

As gas-filled tubes cannot be extinguished by putting a negative voltage on its grid, some other means must be provided. In inverter circuits, a commutating capacitor is placed across the ends of the center tap transformer which is also across the plates of the gas-filled tubes. This capacitor charges when one tube fires which places a negative voltage on the plate of the other tube to extinguish that tube. The commutating choke acts by means of its inductance to continue the flow of current and to charge the commutating capacitor during any half cycle.

It is an object of the invention to provide an inverter circuit having at least two serially connected commutating chokes but having at least one short circuited until an output is obtained from the inverter.

It is another object of the invention to provide an inverter circuit having at least two serially connected commutating choke coils, one of which is short circuited by the closed contacts of an electromagnetic relay and where the relay is energized by the output from the inverter.

The above and other objects of the invention will be more readily understood from the following detailed description particularly when taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing, the figure shows a schematic diagram, partially in block form, of an embodiment of the invention.

In the drawing, an inverter 10 is shown in block form. Such an inverter is well known in the art and has output terminals 11 and 12 across which an alternating current voltage is developed. A direct current power supply 13 also shown in block form has its negative terminal 14 connected by connection 15 to an input terminal 16 of the inverter 10. In the conventional inverter circuit, the input terminal 16 is connected to the cathode of the inverter tubes. The positive terminal 17 of the power supply 13 is connected through a commutating choke coil 18 and thence through another commutating choke coil 19 to another input terminal 20 of the inverter 10. In the conventional inverter, the input terminal 20 is the center-tap of the transformer heretofore mentioned in the general description of the conventional inverter.

An electro-magnetic relay 21 adapted to operate on alternating current has its winding 22 connected directly across the output terminals 11 and 12 of the inverter 10. A movable contact 23 of the relay 21 is connected to the junction of coil 18 and coil 19. A fixed contact 24 of the relay 21 is connected to the input terminal 20. Thus, the contacts 23 and 24, when closed, short circuit the coil 19 to reduce the inductance in the circuit between the positive terminal 17 of the power supply 13 and the input terminal 20 of the inverter 10. Conversely, when the contacts are open the inductance of the path is increased.

In operation the circuit functions as follows: Prior to turning on the circuit, the relay 21 is non-energized and the contacts 23 and 24 are closed, thus short circuiting coil 19. Under such conditions, the low value of the choke coil 18 will enable the inverter to start operating. As soon as an output is developed across the terminals 11 and 12, current will flow through the winding 22 of the electro-magnetic relay 21 and movable contact 23 is moved away from the fixed contact 24. The short circuit is thus removed from across the choke coil 19 and the proper commutating inductance is in the circuit. This condition will remain as long as there is an output from the inverter 10. When the circuit is turned off, the relay is de-energized and contacts 23 and 24 are closed thus putting the circuit again in condition for easy starting.

Having thus set forth the nature of my invention, what I claim is:

1. In an electronic inverter adapted to convert a direct current supply to alternating current, commutating choke means between said direct current supply and said inverter, switching means across a portion of said commutating choke means, and means for operating said switching means from the output of said inverter to increase the value of said commutating choke means when said inverter provides an output therefrom whereby said inverter by virtue of a lower than normal value of choke inductance is enabled to start readily and upon starting the choke inductance is increased to its normal operating value.

2. In an electronic inverter adapted to convert a direct current supply to an alternating current, a commutating choke coil between said direct current supply and said inverter, an electromagnetic relay having a winding and a pair of normally closed contacts said contacts being connected across a portion of said commutating choke coil, and the winding of said relay being connected across the output of said inverter whereby when said inverter by virtue of a lower than normal value of choke inductance is enabled to start readily and upon starting said relay operates to open said normally closed contacts and hence increase the inductance to its normal operating value.

3. In an electronic inverter adapted to convert a direct current supply to alternating current comprising, a commutating choke means connected between the direct current supply and the inverter, switching means connected to the commutating choke means which normally short circuits a portion thereof, said switching means operated by the current output from the inverter to open the short circuit when the inverter provides an output.

ERNEST LEVY, Jr.

REFERENCES CITED

The following references are of record in the file of this patent:

FOREIGN PATENTS

| Number | Country | Date |
| --- | --- | --- |
| 530,463 | France | Oct. 3, 1921 |